United States Patent [19]

Kasbia et al.

[11] Patent Number: 4,622,439
[45] Date of Patent: Nov. 11, 1986

[54] DETECTION OF GROUND OR LOOP START CONFIGURATION IN TELEPHONE LOOP SIGNALLING CIRCUIT

[75] Inventors: Puran S. Kasbia, Kanata; Yuan-Lu Li, Toronto, both of Canada

[73] Assignee: Northern Telecom Limited, Montreal, Canada

[21] Appl. No.: 600,944

[22] Filed: Apr. 16, 1984

[51] Int. Cl.⁴ .................. H04M 3/22; H04M 7/14; H04M 19/02

[52] U.S. Cl. .................. 379/252; 379/338; 379/229

[58] Field of Search ....... 179/18 FA, 18 AH, 18 AD, 179/18 HB, 78 R, 78 A, 80, 84 R, 84 A

[56] References Cited

U.S. PATENT DOCUMENTS

| | | | |
|---|---|---|---|
| 3,936,614 | 2/1976 | Suntop | 179/16 EC |
| 4,002,850 | 1/1977 | Richards et al. | 179/18 AH |
| 4,079,208 | 3/1978 | Rogers et al. | 179/18 FA |
| 4,190,745 | 2/1980 | Jusinskas, Jr. et al. | 179/18 AH |
| 4,221,936 | 9/1980 | Vaughan | 179/18 AD |
| 4,310,725 | 1/1982 | Mehaffey | 179/18 AH |
| 4,310,728 | 1/1982 | Dumont | 179/18 HB |
| 4,320,258 | 3/1982 | McDonald | 179/18 HB |
| 4,385,336 | 5/1983 | Takeshita et al. | 361/42 |
| 4,535,201 | 8/1985 | Kasbia et al. | 179/18 FA |

Primary Examiner—Thomas W. Brown

[57] ABSTRACT

A telephone loop signalling circuit, which automatically replicates either a loop start or a ground start configuration under virtually all operating conditions of the telephone line including those which have heavily induced power line voltages. The circuit utilizes a bias network connected to the central office side of the line together with a plurality of detectors which coact with logic circuitry to differentiate between the two configurations under these widely varying conditions.

4 Claims, 2 Drawing Figures

DETECTION OF GROUND OR LOOP START CONFIGURATION IN TELEPHONE LOOP SIGNALLING CIRCUIT

The following commonly assigned patent application is related to this application:
Title: GROUND START DETECTION IN TELEPHONE LOOP SIGNALLING CIRCUIT
Inventors: Puran Singh KASBIA and Yuan-Lu LI
Ser. No.: 600,789
Filed: in the United States on Apr. 16, 1984, now U.S. Pat. No. 4,535,201.

This invention relates to a loop signalling circuit for replicating signalling functions on a telephone line and more particularly to a substantially universal circuit which will function on either a loop start or a ground start configuration of telephone equipment connected to the line, even in the presence of relatively high induced power-line voltages.

BACKGROUND OF THE INVENTION

Loop signalling circuits have been developed in the past to increase the loop operating range by providing a replication of signalling functions particularly for long loop applications such as when the remote terminal (e.g. a telephone set or a PBX-private branch exchange) is aore than about 5,000 meters from the central office. Such loop signalling circuits employed numerous option switches to provide for the different operating arrangements of the telephone equipment. For example, one switch was used to select either a loop start or a ground start mode of operation. Another switch was used to change the ringing detector response to provide for various duration ringing waveforms. Yet another switch was used to enable the detection of ringing signals from an ungrounded source at the central office. These loop signalling circuits were also inserted in series with the telephone lines to isolate some of the interference signals such as longitudinally induced power-line signals, and to boost and repeat the wanted signalling functions.

It is therefore desirable to have a single loop signalling circuit in which the signalling functions on the central office side of the telephone line are replicated on the remote terminal side and vice versa, regardless of the operating configuration (e.g. loop or ground start) of the telephone equipment. Such a circuit must provide all signalling functions. These include loop closure normally provided by a hookswitch, pulse dialling provided by a rotary switch, and ringing detection provided by the ringer at the remote terminal; and in addition, ring-ground detection, loop current detection, and dial pulse detection at the central office. In alternate applications such as with emergency telephones, ground start operation at the remote terminal and detection at the central office must also be replicated. Voice and data message signals are generally routed around the signalling circuit via a separate d-c isolated path.

STATEMENT OF THE INVENTION

It has been discovered that by utilizing a plurality of detectors and sensors together with a high impedance bias network applied across the telephone line, logic circuitry can be utilized to provide a virtually universal loop signalling circuit which will function without modification in substantially all telephone loop circuits. Thus, in accordance with the present invention there is provided a loop signalling circuit for replicating signalling functions on a telephone line serially connected between a central office and a remote terminal operating in either a loop start or a ground start configuration. The circuit comprises circuitry for detecting a-c ringing sighals from the central office on the lelephone line. In addition there is circuitry for detecting spurious a-c signals other than the ringing signals on the central office side of the line. The circuit also has means for detecting the magnitude of any d-c voltage which exceeds a preselected value across the central office side of the telephone line when in an on-hook state. The loop signalling circuit is characterized by means for applying a high impedance d-c bias voltage to each side of the line and logic means responsive to the detecting means for determining the loop start or ground start configuration of the central office.

In particular embodiments the circuit has means responsive to the determination of the loop start or ground start configuration at the central office by the logic means for replicating the equivalent configuration on the remote terminal side of the telephone line. It may also have means responsive to a loop start or ground start condition at the remote terminal for replicating the equivalent condition on the central office side of the telephone line. With this circuit, increased operating range between a central office and either a telephone set or a PBX line circuit can be provided in the presence of longitudinally induced power-line and other spurious signals.

BRIEF DESCRIPTION OF THE DRAWINGS

An example embodiment of the invention will now be described with reference to the accompanying drawings in which, combined.

DESCRIPTION OF THE PREFERRED EMBODIMENT

Figure 1:
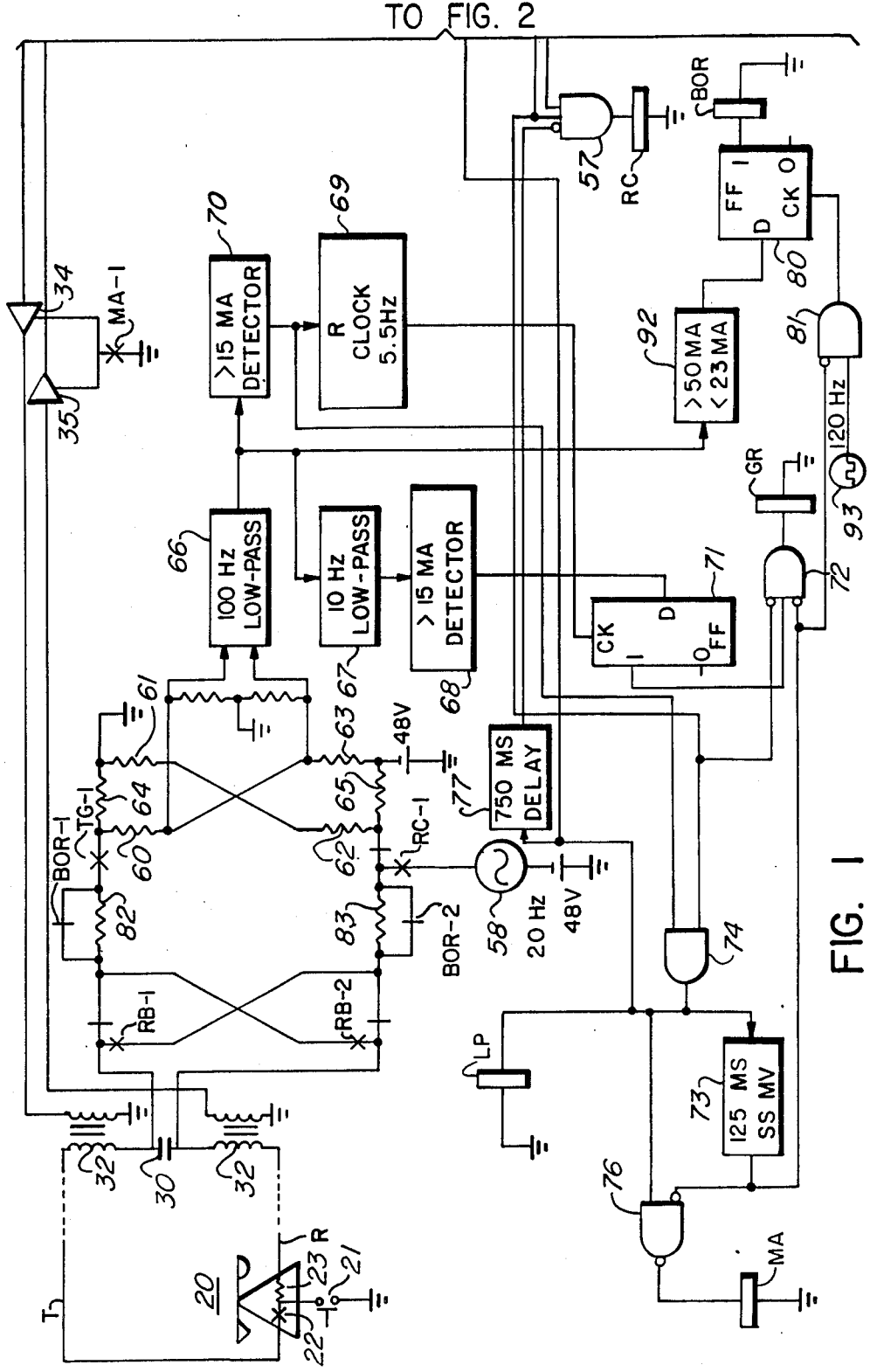
FIGS. 1 and 2 illustrate a block and schematic circuit diagram of a loop signalling circuit connected in series with the tip and ring of a telephone line between a remote terminal and a central office.
Figure 2:
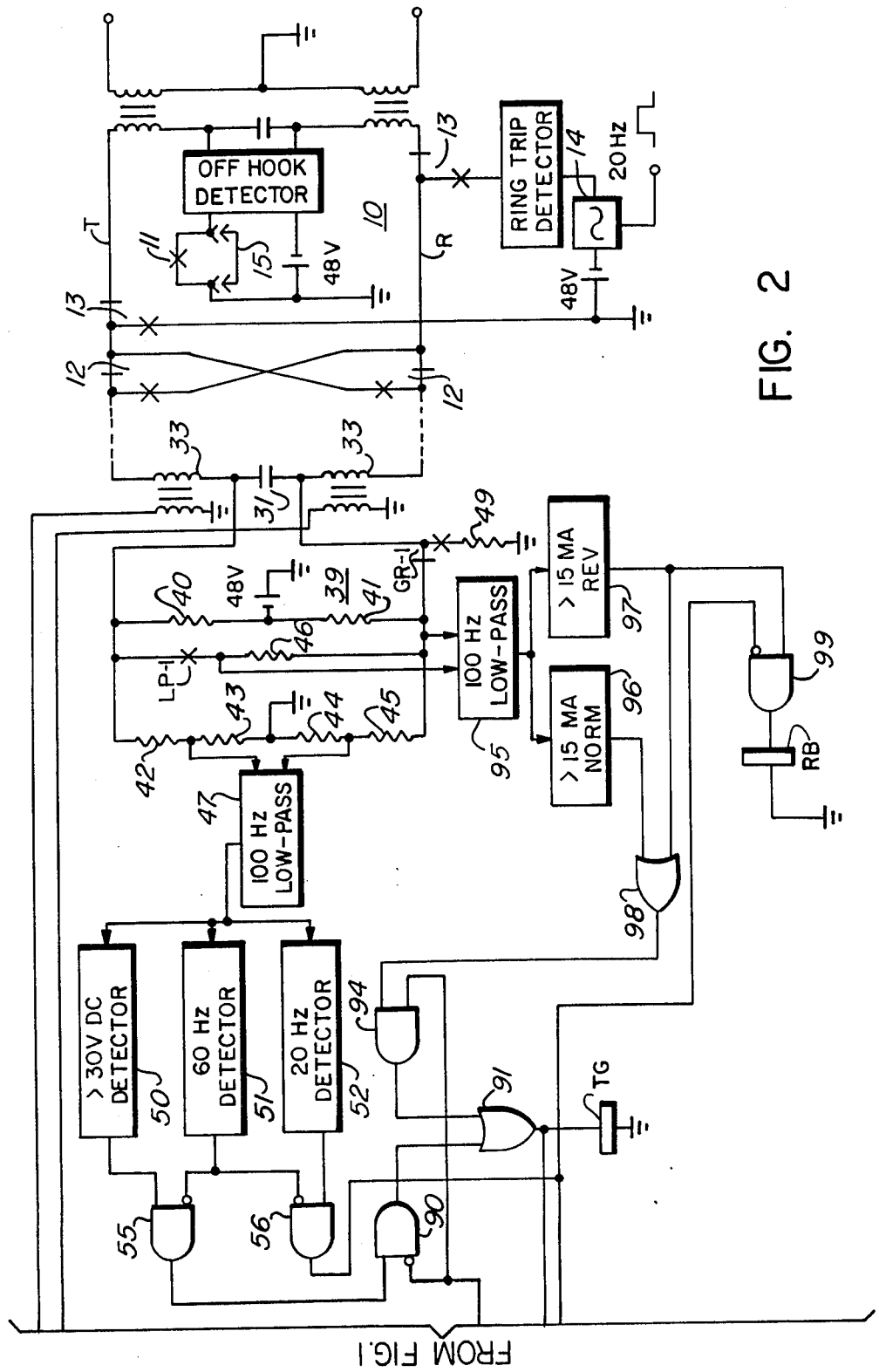

Referring to FIGS. 1 and 2, the schematic illustrates input circuitry at the central office, generally 10, with a standard ground start configuration. In this configuration, the tip lead T remains ungrounded due to the open contacts 11 during an idle state while the −48 volt battery is applied to the ring lead R via the ringing transfer contacts 13. The balance of the components at the central office 10 are well known and will only be referred to as required to understand the operation of the loop signalling circuit. Likewise, a ground start configuration is illustrated at a manually operated remote telephone terminal, generally 20, which shows the normally open ground start contacts 21, and the normally open hookswitch contacts 22 which are in series with the representative impedance 23 of the telephone 20.

In a loop start configuration, a jumper 15 is placed across contacts 11 in the office 10, while contacts 21 would either be not present or remain open-circuited at all times during the operation of the remote terminal 20. As is well known, the manually actuated ground start terminal 20 could be replaced by a loop start private line set or a ground start PBX.

As discussed previously, the present invention is directed to a loop signalling circuit. Voice and data message signals carried by the telephone line are routed around the circuit via a d-c isolated path. This is illustrated in simplified form by a two-way amplifier circuit including d-c isolating capacitors 30 and 31, transformers 32 and 33, and amplifiers 34 and 35. The gain of the amplifiers 34 and 35 can be reduced by actuation of the normally open contacts MA-1 of the maximum attenuation relay MA as described hereinafter.

The central office side of the loop signalling circuit has a high impedance bias source generally 39, comprising a −48 volt battery feeding the tip and ring leads through current limiting resistors 40 and 41 respectively. A high impedance monitoring network is also connected from each side of the line to ground through isolating resistors 42, 43, 44, and 45. The monitoring network on the central office side of the line includes a 100 Hz low-pass filter 47 feeding a d-c detector 50 (the output of which goes high whenever the difference in voltage between the tip and ring leads is greater than 30 volts), a spurious signal (e.g. 60 Hz power line) detector 51, and a ringing (e.g. 20 Hz) signal detector 52, each of which monitors the signal between the junction of the resistors 42, 43, and the junction of resistors 44, 45.

GROUND START IDLE STATE

In the ground start idle circuit state (i.e. a floating tip lead due to the open contacts 11), the d-c voltage on the tip lead supplied by the bias source 39 is substantially the same as the −48 volt battery voltage supplied by the central office 10. This condition results in a low at the output of the >30 volt detector 50 which inhibits the AND gate 55 and in turn the output of AND gate 90 and OR gate 91 so that the latter's output is in a low state and the tip ground relay TG is unactuated. Should a strongly induced spurious (e.g. 60 Hz power line) signal be present, the voltage difference between the essentially a-c grounded ring lead and the floating tip lead may periodically exceed 30 volts during a portion of each 60 Hz cycle. As a result the output of the detector 50 will alternate between a high and a low state. During such a condition the 60 Hz detector 51 goes high thereby inhibiting the AND gate 55 through its inverted input. This prevents false operation in a ground start condition by ensuring the relay TG remains unactuated. As a result the normally open contacts TG-1 stay open thereby replicating a floating tip condition on the terminal side of the loop signalling circuit.

GROUND START RINGING STATE

During the ground start ringing state, a 20 Hz intermittent ringing generator 14 is connected to the telephone line at the central office 10 upon actuation of the ringing transfer contacts 13 in a well known manner. The resultant ringing signal is detected across the tip and ring by the 20 Hz detector 52 which causes the output of AND gate 56 to go high. Concurrently, the ground applied to the tip lead via transfer contacts 13 is detected by the >30 volt detector 50 which causes the output of AND gate 55 to go high as well. While the detector 52 is shown as a 20 Hz detector which is the standard ringing signal frequency in North America, it may have a detection range of 16 to 33 Hz so as to cover all ringing signal frequencies. Likewise, while the detector 51 is designated as a 60 Hz detector which is the standard power line frequency in North America and hence the greatest source of interference on this continent, it preferably detects the entire range of spurious signal frequencies both below and above those of the ringing signals. The purpose of this detector 51 is to insure power-line induced signals, particularly on the open-circuited tip side of the line, which occur during a ground start condition, are not erroneously detected by the >30 volt d-c detector as indicating a loop start condition. In addition the detector 51 controls an inverted input to AND gate 56, to insure that any leakage of a strong 60 Hz power line signal through the 20 Hz detector 52 during a ground start idle state, does not allow the output of the gate 56 to go high.

If, as explained hereinafter, the inverted input to AND gate 57 is low and the output of OR gate 91 is high (indicating a tip ground condition at the central office 10), the output of AND gate 57 is driven high by the output of AND gate 56 thereby actuating the ringing control relay RC. This causes the ringing transfer contacts RC-1 to actuate thereby applying a 20 Hz ringing signal from a ringing signal generator 58 to the ring side of the line. Concurrently, the TG relay operates closing contacts TG-1 thereby applying a relatively low impedance or virtual ground to the tip side of the line. The ringing signal generator 58 continues to be periodically applied to the terminal side of the circuit substantially in unison with the application of ringing signals from the generator 14 at the central office 10.

GROUND START INITIATION AND ANSWER STATE

During a ground start, switch contacts 21 at the terminal 20 are momentarily closed which causes a current to flow from the −48 volt source in the loop signalling circuit through the ring lead to ground. This is detected by a voltage differential developed across a bridging circuit comprising high impedance resistors 60, 61, 62, and 63 due to an imbalance generated across the two line terminating resistors 64 and 65 resulting from the line current flowing therethrough. This voltage differential is passed through a 100 Hz low-pass filter 66, a 10 Hz low-pass filter 67, to a >15 mA detector 68 which in essence detects the presence of a d-c voltage resulting from a line current of >15 mA through the terminating resistor 65. The output of the detector 68 goes high in response to the detected current in the line to set a D-type flip-flop 71 at about 90 ms intervals whenever a >15 mA signal through the resistor 65 is detected directly by a second detector 70. Initially, a free-running clock 69 generates a square-wave signal at about a 5.5 Hz rate with a 180 ms period, as long as the output of the detector 70 is low. If the output of the detector 70 goes high during the half cycle that the output of the clock 69 is low, the latter is resynchronized immediately and its output then goes high for one complete half cycle, i.e. 90 ms. Whenever the clock 69 output goes low during the other half cycle, it immediately goes to, or returns to a high state if the output of the detector 70 has become or remains high. This produces a series of short pulses which continues to clock the flip-flop 71 at the 90 ms rate. When the detector 70 output goes low for a sustained period, the clock 69 will again return to its free-running state. The high output signal from the D-type flip-flop 71 causes the output of AND gate 72 to go high providing both the output of AND gate 55 and the output of a 125 ms single-shot multivibrator 73 are both low. This in turn activates the ground return relay GR which actuates contacts GR-1 and places a ground start resistance 49 in the ring lead of the central office side of the circuit.

The purpose of the filter 67, the detectors 68 and 70, the clock 69, the D-type flip-flop 71, and the AND gate 72, is to ensure a ground start condition is not erroneously detected in the presence of relatively large induced power-line voltages or other spurious signals. When the loop on the remote terminal side is short, the loop current, under either ground or loop start conditions, will be relatively high and will be substantially in step with actuation of the switches 21 or 22. With longer loops, the steady state current will be much lower and there will be a lag in reaching this state due to the relatively long time constant encountered in the loop. In addition, during an idle ground start state, with a floating tip lead, relatively large induced 60 Hz power line signals can result in the peak loop current exceeding 15 mA. In order to ensure that this does not initiate a ground start condition, the incoming signal is simultaneously coupled directly to the detector 70 and through the low pass filter 67 to the detector 68. The fast-acting detector 70 resets the 5.5 Hz clock 69 whenever the current initially exceeds 15 mA. Thus, the clock generator 69 provides a controlled delay of about 150 ms in the operation of the D-type flip-flop after current begins or ceases to flow in the terminal loop. This ensures that the D-type flip-flop 71 is not set unless the incoming current exceeds 15 mA for a continuous period greater than 150 ms, thus effectively eliminating any false ground-start state.

The function of the AND gate 72 is to ensure that the ground return relay GR can operate only when the tip lead on the central office side of the circuit is floating. Whenever ground is not present on the central office side of the circuit, the output of gate 55 goes low thereby enabling an inverted input to AND gate 72. Due to the slow discharge of the terminal side of the loop, this may well result in the output of the D-type flip-flop 71 momentarily remaining in a high state so that a spurious ground start condition is indicated by operation of relay GR. This is prevented by delaying the operation of AND gate 72 for an additional 125 ms via the multivibrator 73 which drives a second inverted input to gate 72. The single-shot multivibrator 73 in turn is triggered by AND gate 74 whenever the output of both OR gate 91 (indicating a ground is being applied at the central office 10), and detector 70, go high. The fast-acting output from the detector 70 ensures an immediate response whenever current is interrupted on the terminal loop, such as during dial pulsing. The 125 ms delay circuit 73 is used to ensure that the maximum attenuation relay MA, the ground return relay GR, and the build-out resistance relay BOR do not follow dial pulses which temporarily interrupt current flow in the loop. As a result, maximum attenuation in the amplifiers 34, 35, is maintained throughout the dial pulse interval, while the relays GR and BOR are inhibited by the signal from the delay circuit 73 at the inverted inputs to the gates 72 and 81.

The output of the AND gate 74 actuates the line pulse relay which in turn closes the contacts LP-1 and places a line termination resistor 46 across the tip and ring leads on the central office side of the loop signalling circuit. When the output of AND gate 74 goes high first one and then, after a 125 ms delay, the other input to NAND gate 76 goes high, causing its output to go low which releases the maximum attenuation relay MA. This in turn opens the contacts MA-1 which raises the gain of the amplifiers 34 and 35. Immediately upon actuation of dial pulses or when the receiver 20 is returned to an on-hook state, the output of AND gate 74 goes low which causes the output of NAND gate 76 to go high. This in turn actuates the relay MA and causes the gain of the amplifiers 34 and 35 to be attenuated. Between dial pulses the output of AND gate 74 again goes high thereby actuating the line pulse relay LP. However the delay circuit 73 momentarily prevents the NAND gate 76 from following it so that the relay MA remains actuated and the gain of the amplifiers 34 and 35 reduced throughout the dialling interval.

In addition, the output of the AND gate 74 directly controls an inverted input to AND gate 57 through a 750 ms delay circuit 77. The delay circuit 77 functions only when the loop, on the termination side of the loop signalling circuit, goes from an on-hook to an off-hook state. Its purpose is to prevent the loop signalling circuit from entering an off-hook re-ring state between the time it senses a ring-tripped condition at the terminal 20, and the time the central office 10 (which is still applying ringing) senses the same condition resulting from closure of the relay LP which places the resistor 46 across the central office side of the line. During this interval, which can be anywhere from 160 to 500 ms, ringing would continue to be received at the terminal 20 were it not for the delay circuit 77 which disables the ringing control relay RC for a period of 750 ms immediately upon detection of current in the loop.

In addition, the detection of a current > 50 mA at the output of the filter 66 is coupled through level detector 92 which sets a D-type flip-flop 80 upon being clocked from a 120 Hz clock generator 93 via AND gate 81 in the absence of an output from the delay circuit 73. This in turn operates the build-out resistor relay BOR which in turn opens the contacts BOR-1 and BOR-2 thereby placing the current limiting resistors 82 and 83 in series with the terminal side of the telephone loop. The loop current then drops to between 30 and 36 mA and remains in this region. However should the loop current for any reason drop below 23 mA, it is sensed by the level detector 92 and causes the output of the D-type flip-flop to return to a low state when next clocked by the 120 Hz clock generator 93. The purpose of the generator 93 is to provide a delay to prevent the relay BOR from following the current interruptions caused by dial pulses.

The state of the relay BOR is determined by that of the flip-flop 80 when clocked at 120 Hz intervals. During the dial-pulsing state, the input to the flip-flop 80 will alternate between high and low in unison with the pulses. To prevent the relay BOR from changing state during this interval, the clock input is inhibited by the signal from the delay circuit 73 which drives the inverted input of AND gate 81. By removing the 120 Hz clock the flip-flop 80 and hence the relay BOR remains in the correct state until the dial pulsing is completed.

Once the line termination resistor 46 is placed across the line, the voltage between the tip and ring leads can fall to only a few volts due to the resistance of the line from the central office. Hence concurrent with the actuation of relay LP which places resistor 46 across the line, the AND gate 90 is disabled while AND gate 94 enabled. The voltage across the termination resistor 46 is passed through a 100 Hz low-pass filter 95 and depending upon the normal or reverse polarity of the applied current from the central office 10, is detected by one of the >15 mA detectors 96 or 97 respectively. Current detection by either of these detectors 96, 97, causes their respective outputs to go high which in turn is coupled through an OR gate 98, AND gate 94, and OR gate 91 to maintain a grounded tip condition by continued actuation of relay TG. Should a reverse battery condition be initiated at the central office 10 by actuation of contacts 12 and be detected by the detector 97, it causes the reverse battery relay RB to operate through AND gate 99. This in turn operates the reverse battery contacts RB-1 and RB-2 on the terminal side of the circuit. Reverse battery is applied from the central office 10 to provide answer or toll diversion signalling to the terminal 20 for a telephone or a PBX installation. AND gate 99 has an inverted input from gate 56 which prevents the reverse battery relay RB from being erroneously actuated during the ringing cycle when the tips of the 20 Hz ringing signal can cause a momentary reverse current to flow in the central office side of the loop.

LOOP START IDLE STATE

In the loop start idle state, the jumper 15 is placed across contacts 11 at the central office 10 thereby continuously applying a ground to the tip side of the telephone line. This is continuously detected by the >30 volt detector 50 so that the output of AND gate 55 remains high thereby keeping the tip ground relay TG operated which maintains the TG-1 contacts closed at all times. The low impedance to ground on the tip side keeps any induced power line voltages at a much lower value than may be experienced in a ground start installation when the tip is in an open circuit condition during the idle state. As a result, the output of the 60 Hz detector 51 remains low thereby allowing either or both AND gates 55 and 56 to operate.

LOOP START RINGING STATE

The ringing signal conditions on the telephone line are very similar in both the loop start and ground start conditions since in both configurations the tip lead on both the central office and terminal side of the signalling circuit is maintained in a ground condition by the actuation of the ringing transfer contacts 13 and the continuous operation of the tip ground relay TG.

LOOP START INITIATION AND ANSWER STATE

A major difference occurs when a call is initiated and the remote terminal 20 goes into an off-hook condition thereby closing contacts 22. This condition is detected by a current flow through resistors 64 and 65 resulting in the output of the >15 mA detectors 68 and 70 going high. As a result this drives the output of flip-flop 71 high which indirectly causes the contacts of the line pulse relay LP to close thereby placing the line termination resistor 46 across the central office side of the circuit. However, because the output of AND gate 55 is held high, the AND gate 72 is inhibited from going high and the ground relay GR remains unactuated. This prevents a ground start condition from being applied to the central office side of the circuit by actuation of ground contacts GR-1 which would then connect the ground resistance 49 to the ring side of the line thereby simulating the ground start conditions at the remote terminal 20. Pulse dialling under loop start conditions is essentially the same as in the ground start case with the line pulse relay LP following individual dial pulses from the terminal 20.

What is claimed is:

1. A loop signalling circuit for replicating signals from a central office on a remote terminal side of a telephone line and vice versa when said circuit is serially connected between the central office and the remote terminal, and the central office and remote terminal are operating in either a loop start or a ground start configuration, comprising:
   first operational means for detecting a-c ringing signals from the central office on the telephone line;
   second operational means for detecting spurious a-c signals of a frequency other than said rining signals, on the central office side of the telephone line; and
   third operational means for detecting a d-c voltage which is greater than a preselected value across the central office side of the telephone line;
characterized by:
   means for applying a d-c voltage relative to ground that is greater than said preselected value from a high impedance source to both tip and ring leads on the central office side of the telephone line, thereby resulting in a d-c voltage, across the central office side of the telephone line when in a ground start configuration, that is less than said preselected value; and
   logic means responsive to absence of detection of the d-c voltage by the third operational means and absence of detection of the spurious a-c signals by the second operational means, for signalling a ground start configuration at the central office, and responsive to detection of the d-c voltage by the third operational means for signalling a loop start configuration at the central office.

2. A loop signalling circuit as defined in claim 1 further characterized by:
   fourth operational means responsive to the signalling of the loop start configuration at the central office by said logic means for applying ground and battery to tip and ring leads respectively on the remote terminal side of the telephone line, and responsive to the signalling of the ground start configuration for removing said ground from the tip side of the telephone line.

3. A loop signalling circuit as defined in claim 2 further characterized by:
   further logic means responsive to detection of the a-c ringing signals from the central office by the first operational means in absence of the detection of spurious a-c signals on the central office side of the telephone line by the second operational means, for replicating ringing signals for transmission on the remote terminal side of the telephone line;
   fifth operational means responsive to detection of a loop current resulting from an off-hook termination across the telephone line at the remote terminal for replicating an off-hook termination condition in the loop signalling circuit across the central office side of the telephone line; and
   sixth operational means responsive to the simultaneous detection:
   (i) of the d-c voltage by the third operational means for signalling a loop start configuration from the central office,
   (ii) of the ringing signals from the central office by the first operational means, and
   (iii) of the loop current when the off-hook termination is initially connected at the remote terminal by the fifth operational means,
   for disabling the further logic means for replicating the ringing signals for a period greater than the period required by the central office to remove the a-c ringing signals in response to detection of said off-hook termination condition;

so that after said period and during a re-ring condition, ringing signals will again be replicated on the remote terminal side of the telephone line when said ringing signals are applied from the central office and said off-hook termination is across the telephone line.

4. A loop signalling circuit as defined in claim 3 further characterized by:

seventh operational means responsive to detection of current flow from a reverse battery feed from the central office through an off-hook termination across the central office side of the telephone line, and to absence of ringing signals detected by the first operational means for reversing battery feed on the remote terminal side of the telephone line.

* * * * *